United States Patent Office

3,296,290
Patented Jan. 3, 1967

3,296,290
PROCESS OF SEPARATING ARSANILIC ACID
Edward W. Berndt, Wallace F. Hladky, and Jerry D. Fockler, Charles City, Iowa, assignors to Salsbury Laboratories, a corporation of Iowa
No Drawing. Filed Aug. 12, 1963, Ser. No. 301,636
9 Claims. (Cl. 260—442)

This invention relates to new and improved processes of producing arsanilic acid. More particularly it pertains both to improvements in the condensation technique between the principal reactants aniline and arsenic acid and in the separation of the desired arsanilic acid from tarry byproducts and unreacted starting materials.

Arsanilic acid, also known as para-aminophenylarsonic acid, is a chemical which is used in veterinary medicine for the control of protozoan infections and the stimulation of growth, and also serves as an important intermediate for the preparation of numerous drugs such as carbarsone and tryparsamide.

According to the teachings disclosed in the prior art, arsanilic acid is prepared by condensing aniline and arsenic acid under reflux conditions at temperatures between 150–185° C. and dissolving the reaction product in aqueous sodium hydroxide. The alkaline solution containing the arsanilic acid as a salt separates from the unreacted aniline in the form of a withdrawable layer and yields about 10–30% of the product, leaving unreacted aniline contaminated with tars and arsenic acid in a practically unrecoverable state. An additional operation is required to convert the sodium arsanilic salt into the acid.

In conformity with a more recent simplification, the recovery of arsanilic acid from the reaction mixture is carried out by a stratification process in which the reaction mixture is separated into two zones by the addition of water. The top layer containing excess aniline and tars segregates from the lower aqueous solution of arsanilic acid, unreacted arsenic acid and a small residue of aniline which accrue in varying combinations. The aniline layer must be subjected to several water extractions to recover arsanilic acid in economical yields and this procedure requires bulky and cumbrous equipment for handling the resultant volumes of liquid. It has also been found that the repeated elution of the condensation mixture does not completely separate the aniline layer from the aqueous layer and for that reason permits considerable amounts of aniline oil contaminated by tars to be carried over into the product layer. If, on the other hand, aniline-dissolving organic agents are used to bring about the precipitation of the arsanilic acid, the recovery of such solvents would increase substantially the production costs. Furthermore, the aniline layer must be purified before it can be used again.

We have discovered new procedures of producing arsanilic acid on a commercially expedient level by conducting the condensation reaction under improved and heretofore unexplored operating conditions and/or by effecting the recovery of the arsanilic acid from the reaction mixture on a compact scale such as can be readily accommodated by conventional industrial equipment. We wish it to be understood, however, that our new separation process is independent of the mode by which the condensation has been carried out and that it may be applied to a reaction mixture which has been produced either by the customary method as described, for instance, by Kober and Davis in J. Am. Chem. Soc., Vol. 4, p. 452 (1919), or by our improved reaction technique as hereinafter more fully explained.

I. CONDENSATION REACTION

A major problem encountered in the condensation between aniline and arsenic acid is posed by the formation of tars which partly depends upon the time required for the charge to reach reaction temperature. While this difficulty may be of minor impact in laboratory runs involving small quantities of reactants, it progressively rises with increasing volumes such as projected on a commercial scale. The objective of the commonly accepted procedure is to elevate the temperature to 160–165° C. within the shortest possible time and to complete the condensation at that level. Even under the most favorable operating conditions the heating period for large industrial batches is too long to prevent the degradation of some arsenic acid to arsenic trioxide with the concomitant transformation of substantial amounts of aniline to tars.

In order to keep tar formation at a minimum industrial plants have heretofore been working with an excess of aniline and using a molar ratio of aniline:arsenic acid, hereafter designated as "reaction ratio," as high as 5:1. Such high ratios, however, necessitate large reaction volumes which lower the yield of arsanilic acid per unit volume and thus impair the productive efficiency of the manufacturing equipment. If reaction ratios within the range of 1:1 to 2:1 are employed under conventional conditions, the resulting mixture consists almost exclusively of black tarry compositions from which but a very small amount of arsanilic acid can be retrieved.

We have discovered that tar formation can be considerably reduced in furtherance of greater productive efficiency if the synthesis is conducted under more gentle operating conditions. To this effect we have achieved excellent results at reaction temperatures lower than 160° C., and preferably within a range of approximately 140–155° C. They are attained by reducing the pressure to about 300–500 mm. Hg abs. while the reactants are in residency so as to bring about and sustain a boiling of the mass sufficient to remove the water of formation without depressing the temperature below 140° C.

It is accordingly one feature and important object of the present invention to carry out the condensation reaction under reduced pressure to secure maximum yields of arsanilic acid while concurrently therewith conserving the unreacted starting materials in a recoverable state so that they can be reused in a continuous cycle.

This new and improved method, however, affords further advantages which can be achieved when combined with additional modifications. Aniline is an expensive raw material and costs about twice as much as arsenic acid. Optimum performance of the reaction would, therefore, be attained if the total amount of aniline consumed were converted into arsanilic acid. Differently stated, since the condensation proceeds in stoichiometrical proportions of 1 mole of aniline to 1 mole of arsanilic acid, the theoretical ratio of aniline consumed: arsanilic acid produced, hereafter designated as "conversion ratio," would be 0.429. In actual practice this ratio will be higher due to the inevitable formation of by-products and the impossibility of effecting a quantitative recovery of the arsanilic acid. As previously pointed out, one attempts to maintain the conversion ratio at economic levels by working with an excess of aniline or more specifically with reaction ratios of 5:1 which, however, requires sizable batches of reactants thus depriving the existing technical facilities of their full productive capacity.

We have found, nevertheless, that a conversion ratio of below 1.0 can be approached with a reaction ratio of less than 2.0 if the arsenic acid is gradually added to the aniline in small portions instead of being introduced into the reactor vessel in a single charge. In this fashion each installment of arsenic acid added to the mixture is present with a vast excess of aniline and unites with it to give the desired product before it can degrade the aniline to tars in preponderant proportions. This finding is of technological significance as much larger yields per unit reaction volume and per unit time can be produced while recoveries of unreacted and reusable starting materials are high. For example, a batch containing a simultaneous charge of aniline and arsenic acid in a reaction ratio of 2.65:1 had a conversion ratio of 1.5, whereas the gradual addition of the arsenic acid at the same reaction ratio resulted in a drop of the conversion ratio to 0.9. To produce the same amount of arsanilic acid in a yield of 30% at the conventional reaction ratio of about 5.2:1 would require a reaction volume of 699 volume units, whereas the aforementioned reaction ratio of 2.65:1 necessitates a capacity of only 447 volume units. It follows that the productive efficiency of the equipment is improved by roundly 50% since the reaction time in the latter case is only slightly greater.

II. SEPARATION

Another aspect of this invention concerns the separation and purification of the arsanilic acid and the residual reactants after the condensation has been completed. Our newly developed procedure is characterized by the feature that it dispenses both with the alkaline elution and the cumbersome and voluminous water extraction of the reaction mass, the shortcomings of which have been noted above. According to our invention the separation is rather geared toward altering the composition of the reaction mass so that it will easily release the major part of the arsanilic acid, with or without the tar products, in readily separable form. To this end, after the reaction has run its course, we subject the liquid conglomerate to a mild vacuum distillation at temperatures sufficiently low to minimize tar formation while eliminating the bulk of the unreacted aniline. When the mass has thickened to a point where uniform boiling and stirring become difficult, it is liquidized again by the addition of water. Thereupon the resolubilized mass is exposed to steam distillation which removes the majority of the remaining aniline and leaves a mixture of arsanilic acid, arsenic acid, tars and water. The aniline withdrawn from the reaction mass in the foregoing manner accrues in a purified state without tarry contaminants and can be recycled without further treatment, which is one of the marked advantages of our process.

At this point the concentrate registers a pH of below 3.5 at 25° C. and is ready for the recovery of the arsanilic acid. This can be accomplished in two ways, essentially differing from each other in whether upon cooling the tars precipitate with the arsanilic acid or remain in solution. Which of the two routes is to be followed depends on the concentration of the unconsumed arsenic acid in the mixture. If the content of arsenic acid is below approximately 2.5 g. mole per liter of solution, the tars will separate in conjunction with the arsanilic acid. If, on the other hand, the concentration of the solution is higher so as to contain larger amounts of arsenic acid per unit volume, only arsanilic acid will precipitate. Accordingly the amount of water contained in the mixture will determine the course to be chosen for the recovery of the final product. The amount of water to be added to arrive at a given concentration of arsenic acid may be a matter of optional adjustment or predicated upon the original reaction ratio selected for the synthesis. The lower the reaction ratio or, differently termed, the lower the molar ratio of aniline:arsenic acid has been, the greater will be the amount of unreacted arsenic acid in the mixture and the more water will have to be used to bring the solution to a given concentration.

In the case where the arsenic acid is present in higher proportions than 2.5 g. mole per liter, the mixture is worked up by cooling to room temperature and stirring. Only crude arsanilic acid precipitates and is filtered. The precipitate is treated with charcoal for the purpose of decolorization and recrystallized from water. The filtrate containing a small amount of arsanilic acid, tars and arsenic acid is further diluted with water to precipitate the tars which are removed by filtration or other suitable means. The essentially tar-free filtrate may be concentrated to obtain the remainder of the arsanilic acid and the unreacted arsenic acid can then be recycled after further concentration.

In the event that the arsenic acid content in the mixture is lower than 2.5 g. mole per liter, cooling and stirring causes coprecipitation of arsanilic acid and tars. The mixture is filtered and the filtrate contains unconsumed arsenic acid in sufficient purity to be recharged to the reaction vessel for a succeeding cycle. The filter cake is treated with hot water which dissolves the arsanilic acid and leaves the tarry by-products in such solid consistency as to be readily separable by filtration or centrifugation. The solution may thereupon be refined by conventional decolorizers and after cooling releases a precipitate of pure arsanilic acid. One or two washings of the tar residue with boiling water permits the collection of an additional crop of arsanilic acid in the same fashion.

The following examples are illustrative of the various embodiments of our invention. They are, however, not to be construed as limiting the same to specific operative details and may be modified and adapted in many ways as would be obvious to a worker skilled in the art.

Example 1

Two hundred and fifty cc. (2.73 moles) of technical 99.6% aniline were added with 99.7 g. (0.5 mole) of 77.6% arsenic acid in a 500 cc. round bottom flask under agitation. The reaction ratio was accordingly 5.4:1. The temperature was increased to 145–148° C. and maintained at the level for 3 hours, while the pressure was decreased from approximately 380–320 mm. of mercury absolute during that time. Thereupon the vacuum was gradually increased to 100–130 mm. Hg. abs. until most of the unreacted aniline was distilled. When the reaction mixture became so thick that it impeded further agitation, the vacuum was broken and 100 cc. of water were added. The hot mass was then subjected to rapid steam distillation until the pH dropped below 3.5. The solution was diluted with 200 cc. of water and cooled to precipitate arsanilic acid and tars. The precipitate filtered from the arsenic acid solution was washed with cold water, treated with boiling water and filtered to remove the major portion of the tarry material. The dark filtrate was decolorized with charcoal and after separation from the sediment it was cooled. From the solution a mass of pure arsanilic acid precipitated in crystalline form. It was dried and constituted a yield of 28 g. An additional 3.8 g. of crude product was obtained from the arsenic acid filtrate by concentration whereupon the latter was in reusable form for a new reaction.

The foregoing example illustrates a type of operation wherein the reaction was carried out with the reactants at a reaction ratio of 5.4:1 under reduced pressure, and the separation was accomplished with a mixture containing no more than about 72 g./l. of arsenic acid. The conversion ratio (aniline consumed: arsanilic acid) was 1.21.

Example 2

Two hundred and fifty cc. (2.73 moles) of technical 99.6% aniline were added with 97.6 g. (0.5 mole) of 77.6% arsenic acid in a 500 cc. round bottom flask. The reaction ratio was accordingly 5.5:1. The temperature was raised to 160–165° C. and held at that level for 1.5 hours and after the condsensation was completed, the mixture was subjected to rapid vacuum distillation at a pressure of 100–130 mm. Hg abs. After the major portion of unreacted aniline was so removed, 100 cc. of water were added and the solution was steam distilled for ½ hour. The mixture was then transferred to a beaker and diluted to about 500 ml. with water. At this point the pH was 3.3 at 27° C. The crude product containing arsanilic acid and tars, which gradually crystallized, was finally filtered from the arsenic acid solution and worked up as in Example 1. The filtrate was concentrated in vacuo to recover an additional crop of arsanilic acid. The total yield amounted to 30.4 g.

The foregoing reaction constitutes a modification of Example 1 in that the condensation reaction was conducted without a vacuum while all other operating conditions were the same. The separation step was carried out with a solution containing about 75 g./l. of arsenic acid.

*Example 3*

Two hundred and fifty cc. (2.73 moles) of technical 99.6% aniline were placed in a 500 cc. round bottom flask. At a temperature of 142–151° C. and under a vacuum of 380–460 mm. Hg abs., 259 g. (1.40 moles) of 76.6% arsenic acid was added dropwise during a period of 2⅔ hours. The reaction ratio was accordingly 2.0:1. The mixture was thereupon subjected to vacuum distillation at a pressure of 50 mm. Hg. abs. until it became very thick. At this point 100 cc. of water were added and the mass was steam distilled until the distillate was no longer cloudy. The solution was diluted to about 400 cc. and allowed to cool, precipitating arsanilic acid and leaving the tars dissolved. The blue solid was collected on a filter and recrystallized from boiling water that contained 5 g. of decolorizing charcoal. After drying a yield of 40.0 g. of 100% arsanilic acid was harvested to which 8.0 g. was added after concentrating the filtrate.

The foregoing reaction illustrates the method in which our vacuum technique was applied to the condensation while the arsenic acid was added in small and continuous charges at a final reaction ratio of 2:01. Since the volume after steam distillation and dilution was about 400 cc. and contained about 156 g. of arsenic acid, the concentration of arsenic acid was greater than 2½ g. mole per liter so that only arsanilic acid precipitated while the tars remained in solution. The conversion ratio in this example was less than 0.8.

*Example 4*

Two hundred and fifty cc. (2.73 moles) of technical 99.6% aniline were placed in a 500 cc. round bottom flask and 200 g. (1.08 moles) of 76.6% arsenic acid was added during a period of 2¼ hours. The condensation proceeded at 160–172° C. under atmospheric pressure. After the reaction was completed, the mixture was subjected to vacuum distillation at 100–115 mm. Hg abs. and a temperature of 121–1250 C. until most of the aniline was removed and the mass became viscous. Thereupon the vacuum was broken, 100 cc. of water were added and the solution was steam distilled until the remaining free aniline was expelled. The solution was gradually diluted to 700 cc. whereupon arsanilic acid and tarry by-products precipitated as a dark mass. After filtration the filter cake was washed and extracted with boiling water which dissolved the arsanilic acid and left the insoluble tars in filterable condition. The filtrate was treated with 3 g. of decolorizing charcoal and filtered again. Upon cooling the filtrate yielded a crystalline mass of arsanilic acid which was separated, washed with a small amount of water and dried at 85° C. A second crop was obtained by concentrating the filtrate to bring the total yield to 55.3 g.

The foregoing experiment exemplifies an embodiment of our invention in which the condensation is carried out under standard conditions except for the gradual addition of the arsenic acid at a reaction ratio of 2.5:1, while the separation followed our newly developed method of precipitation from the reaction mass after the treatment herebefore described. The example demonstrates that the extent of tar formation can be substantially limited even at reaction temperatures of above 160° C. and at reaction ratios half of those commonly used, when arsenic acid is charged to the aniline in small fractions. The conversion ratio in this experiment was 1.06. The amount of arsenic acid in the diluted condensate of 700 cc. was 91 g., that is, less than 2.5 g. mole (355 g.) per liter, thus causing coprecipitation of the arsanilic acid and tarry by-products.

As previously pointed out, although our new condensation technique and our method of separation supplement each other and may advantageously be combined in a single process for efficient and economical operation, the two may also be practiced independently. More particularly our novel procedure of recovering arsanilic acid as developed by the treatment of the unrefined reaction mixture containing arsanilic acid, tars, water, and unreacted aniline and arsenic acid may be employed regardless of how the reaction was carried out. It will also be understood that our processes are susceptible of manifold variations and adaptations as will be apparent to a person having ordinary skill in the art and to whom these specifications are especially addressed. For instance, all the steps of separating a precipitate from its mother liquor may be carried out by contrifugation, decantation or other available means, although filtration has been disclosed in the foregoing examples. Likewise the reaction ratios recited in the examples may be varied in accordance with technological requisites and facilities and are not to be construed as limiting the scope of our invention.

What we claim is:

1. A process of separating arsanilic acid from the reaction mixture produced by the condensation of aniline with arsenic acid comprising the steps of reacting aniline with arsenic acid, subjecting the reaction mixture to vacuum distillation until the major portions of water and of unreacted aniline are removed, liquidizing the resulting viscous concentrate with water, steam-distilling said concentrate to eliminate residual unreacted aniline, diluting the concentrate with water, cooling the same and isolating separately therefrom arsanilic acid, tars and unreacted arsenic acid.

2. A process of separating arsanilic acid from the reaction mixture produced by the condensation of aniline with arsenic acid comprising the steps of reacting aniline with arsenic acid, subjecting the reaction mixture to vacuum distillation until the major portions of water and of unreacted aniline are removed, liquidizing the resulting viscous concentrate with water, steam-distilling said concentrate to eliminate residual unreacted aniline, diluting the concentrate with water to an arsenic acid content of more than approximately 2.5 g. mole per liter, cooling the resulting solution and separating therefrom the arsanilic acid precipitate.

3. A process of separating arsanilic acid from the reaction mixture produced by the condensation of aniline with arsenic acid comprising the steps of reacting aniline with arsenic acid, subjecting the reaction mixture to vacuum distillation until the major portions of water and of unreacted aniline are removed, liquidizing the resulting viscous concentrate with water, steam-distilling said concentrate to eliminate residual unreacted aniline, diluting the concentrate with water to an arsenic acid content of less than approximately 2.5 g. mole per liter, cooling the resulting solution, separating the precipitate therefrom, treating the precipitate with boiling water to dissolve the arsanilic acid, separating the hot solution from the undissolved tars, and cooling the solution to recover therefrom the arsanilic acid.

4. The separation process of claim 2 in which the reaction mixture is produced by the condensation of aniline with arsenic acid under vacuum at temperatures below 160° C.

5. The separation process of claim 2 in which the reaction mixture is produced by the condensation of aniline with arsenic acid under vacuum at temperatures below 160° C. while the arsenic acid is added to the aniline in small proportions during the reaction.

6. The separation process of claim 2 in which the reaction mixture is produced by the condensation of aniline with arsenic acid under atmospheric pressure and at temperatures above 160° C. while the arsenic acid is added to the aniline in small proportions during the reaction.

7. The separation process of claim 3 in which the reaction mixture is produced by the condensation of aniline with arsenic acid under vacuum at temperatures below 160° C.

8. The separation process of claim 3 in which the reaction mixture is produced by the condensation of aniline with arsenic acid under vacuum at temperatures below 160° C. while the arsenic acid is added to the aniline in small proportions during the reaction.

9. The separation process of claim 3 in which the reaction mixture is produced by the condensation of aniline with arsenic acid under atmospheric pressure and at temperatures above 160° C. while the arsenic acid is added to the aniline in small proportions during the reaction.

References Cited by the Examiner
UNITED STATES PATENTS

| | | | |
|---|---|---|---|
| 1,405,228 | 1/1922 | Koher | 260—442 |
| 2,245,572 | 6/1941 | Christiansen | 260—442 |
| 2,677,696 | 5/1954 | Rundell et al. | 260—442 |

HELEN M. McCARTHY, *Acting Primary Examiner.*

TOBIAS E. LEVOW, *Examiner.*

E. C. BARTLETT, W. F. W. BELLAMY,
*Assistant Examiners.*